Patented Feb. 10, 1948

2,435,909

UNITED STATES PATENT OFFICE 2,435,909

ADHESIVE COMPOSITION COMPRISING AN AQUEOUS DISPERSION OF POLYVINYL ACETATE AND PINEWOOD EXTRACT

Norman G. Tompkins, Arlington, Mass., assignor to Dewey and Almy Chemical Company, North Cambridge, Mass., a corporation of Massachusetts No Drawing. Application May 19, 1947, Serial No. 749,081. In Canada June 27, 1945

5 Claims. (Cl. 260—27)

REISSUED
NOV 1 1949

The present invention relates to adhesive compositions and more particularly to adhesive compositions comprising polyvinyl acetate dispersions with certain resins. Dispersions of synthetic resins of the polyvinyl-acetate type have been found very satisfactory as adhesives for use in joining many different types of materials. They have certain disadvantages, however, notable among which is a rather low degree of water resistance. This difficulty is of importance in connection with adhesives used to seal cardboard or mill board cartons and boxes. A straight plasticized polyvinyl acetate dispersion in water performs very well for this use as to quickness of adhesion and strength of adhesive bond, but the water resistance of the final film is not adequate for uses where the sealed package must withstand exposure to moisture.

It is, accordingly, an object of the present invention to produce a modified polyvinyl acetate water dispersion which is satisfactory for sealing packages of paper and cardboard from the points of view of quickness of adhesion, strength of adhesive bond, flexibility of the adhesive film, water resistance, and adaptability to existing sealing machinery.

In accordance with the invention, the foregoing object is achieved by incorporating in the dispersion an additional resin obtained, by selective extraction, from resinous wood. The preferred compositions are those in which there is included a relatively small amount of a mutual, volatile water-immiscible solvent for the resins although it is within the scope of the invention to omit solvent entirely from the composition. In every case, however, the adhesive is in the form of a dispersion in an inert medium, preferably water.

A suitable plasticizer is incorporated to lend a sufficient degree of flexibility to the final film in accordance with well understood practice.

The compositions of the invention may be made by dissolving the additional resin and plasticizer and emulsifying the resulting solution. This emulsion may then be added to an already formed dispersion of the polyvinyl acetate. It has been found, however, that better results are obtained by simply stirring the said solution into a dispersion of polyvinyl acetate without first forming a separate resin emulsion, provided the dispersing or stabilizing agent of the polyvinyl acetate dispersion is present in sufficient amount.

The nature and the manufacture of the resins made use of in the present invention are disclosed in the United States Patents 2,242,529; 2,287,351; and 2,287,352, where the relationship of these resins is clearly shown. Partially gasoline-soluble resins are derived as a by-product in the furfural extraction of F. F. wood rosin and are also derived as distillation residue in the distillation of F. F. wood rosin (see Patent No. 2,242,529). The gasoline-insoluble resins also used in the invention are derived from the dark-colored residue concurrently removed with F. F. wood rosin after extraction of pine chips with a coal tar hydrocarbon such, for instance, as benzene, toluene, xylene (see Patent Nos. 2,287,351 and 2,287,352).

The invention will be further disclosed by the following examples, which are given by way of illustration and not of limitation.

Example I

A dispersion is first formed containing 25 parts of polyvinyl acetate dispersed in 25 parts of water by the use of 1½ parts of polyvinyl alcohol-acetate as a dispersing agent. Twenty-two parts of the gasoline insoluble resinous product described in Patent No. 2,287.351 are mixed with 7 parts of di-butoxyethyl phthalate and 6 parts of benzene, and this solution added to the dispersion with stirring. Fifteen parts of water are then stirred into the dispersion.

Example II

The compounding procedure is the same as in Example I, but the proportions are as follow:

| | |
|---|---|
| Polyvinyl acetate | 19 |
| Resinous product of Patent No. 2,287,351 | 26 |
| Di-butoxyethyl phthalate | 8 |
| Benzene | 9 |
| Water | 38 |
| | 100 |

Example III

A dispersion is first formed containing 96 parts of polyvinyl acetate dispersed in 100 parts of water by the use of 4 parts of 80% hydrolyzed polyvinyl acetate. To this is added 4 parts of a 6¼% aqueous solution of di-octyl ester of sodium sulpho succinic acid. One hundred and thirty (130) parts of the partially gasoline soluble resinous product described in Patent No. 2,242,529 are dissolved in a mixture of 15 parts of di-butoxyethyl phthalate and 30 parts of benzene, and this solution is added to the dispersion with stirring. Enough 4% solution of 4000 centipoise methyl cellulose is added to produce a workable viscosity together with enough water to bring the total solids of the dispersion to 54%.

*Example IV*

A dispersion is first formed containing 81.5 parts of polyvinyl acetate dispersed in 85 parts of water by the use of 3½ parts of 80% hydrolyzed polyvinyl acetate. To this is added 4 parts of a 6¼% aqueous solution of di-octyl ester of sodium sulpho succinic acid. One hundred and sixty (160) parts of the partially gasoline soluble resinous product described in Patent No. 2,242,529 are dissolved in a mixture of 9.2 parts of di-butyl phthalate, 9.2 parts of xylene, and 37 parts of benzene, and this solution is added to the dispersion with stirring. Enough 4% solution of 4000 centipoise methyl cellulose is added to produce a workable viscosity together with enough water to bring the total solids of the dispersion to 51%.

*Example V*

Eight hundred parts of the gasoline-insoluble resinous product of Patent No. 2,287,351 are dissolved in a mixture of 250 parts of methyl abietate and 250 parts of benzol. One hundred fifty parts of polyvinyl acetate are dispersed in 300 parts of water with the addition of 17 parts of partially hydrolyzed polyvinyl acetate. The polyvinyl acetate dispersion is then added with stirring to the resin solution and water is added to bring the mixture to the desired consistency.

*Example VI*

One thousand parts of the partially gasoline-soluble resinous product of Patent No. 2,242,529 are dissolved in 250 parts of benzol. One hundred fifty parts of polyvinyl acetate are dispersed in 300 parts of water with the addition of 17 parts of partially hydrolyzed polyvinyl acetate. The latter mixture is then added to the resin solution and water is added to bring the mixture to the desired consistency.

The methods of handling the resin in this invention are substantially identical whether the resin be of gasoline-insoluble or partially gasoline-soluble type. The amount of hydrolzed polyvinyl acetate (the dispersing agent) should be kept as low as possible and still permit the direct addition of the resin to the acetate dispersion; otherwise the water resistance of the adhesive will be lowered. When an 80% hydrolyzed polyvinyl acetate is employed as the dispersing agent, it is preferably used within the range of 4 to 12% based on the vinyl ester by weight.

The proportion of resin may vary considerably. In general, greater improvement of water resistance is obtained with larger amounts of resin. The commercially useful range, as demonstrated by the above examples, includes proportions of resin to polyvinyl acetate of from 88% to about 700%.

Although a volatile mutual solvent for the resins is included in the composition of the example, it is not essential that such a solvent be used. The use of such a solvent facilitates manufacture of the adhesive and gives certain advantages in the final film, such as greater water resistance, due to the more thorough blending of the resin components. If a solvent is not employed, a larger proportion of the plasticizer is ordinarily required.

The proportion of volatile solvent employed may be varied considerably; in general, an amount of solvent between 15% and 25% by weight on the polyvinyl acetate and resin gives good results.

The plasticizer may be any one of the many known organic plasticizers which is compatible with the blend of polyvinyl acetate and resin. Examples of suitable plasticizers are: dibutoxyethyl phthalate, pine oil, triethylene glycol dihexoate, triethylene glycol dioctoate, triacetin, di (diethylene glycol monoethyl ether) phthalate, soft phenol-modified coumarone-indene resins, dibutyl sebacate, dibutyl phthalate, tributyl citrate, dioctyl phthalate, tributyl phosphate, trioctyl phosphate, methyl abietate, hydrogenated methyl abietate, diethylene glycol dibenzoate, dibenzyl phthalate, dimethoxyethyl adipate, acetyl tributyl citrate, N-mono butyl benzene sulfonamide, butyl phthalyl butyl glycollate, dibenzyl sebacate, diethylene glycol dipelargonate, tricresyl phosphate, soft chlorinated diphenyls.

When maximum resistance to mineral and vegetable oils is required, plasticizers of the oil insoluble type as exemplified by diethylene glycol monoethyl ether phthalate should be used.

It is desirable for most uses to incorporate in the adhesive a very small amount of a thickening material to increase the viscosity to suitable values for use with adhesive-applying machinery, in accordance with practice well understood in the adhesive art. The preferred thickening material is high viscosity methyl cellulose.

The various application techniques used in the industry require adhesives of different viscosities. Accordingly, the amount of methyl cellulose added varies with different industrial requirements; but, generally, one-quarter part of 4000 centipoise methyl cellulose is sufficient.

Adhesive compositions in accordance with the invention have been found to have an entirely satisfactory viscosity and quickness of adhesion for use with the conventional automatic case-sealing machinery. When used to bond cardboard made from a highly sized, very water resistant kraft paper stock, an adhesive bond and permanent water resistance well beyond those required in commercial practice are obtained.

This application is a continuation-in-part of my co-pending application, Serial No. 544,337, filed July 10, 1944, now abandoned.

I claim:

1. A liquid adhesive composition comprising an aqueous dispersion of a polyvinyl acetate and a resin, said resin being selected from the group consisting of gasoline-insoluble resins obtained by extracting pine wood with a coal tar hydrocarbon solvent, precipitating the gasoline-insoluble fraction by addition of a saturated paraffinic hydrocarbon and separating the precipitate by filtration, and partially gasoline-soluble, dark-colored, hard resins obtained as a by-product when F. F. wood rosin is dissolved in a low boiling petroleum hydrocarbon and refined to pale grades of wood rosin by selective extraction or as distillation residue in the distillation of F. F. wood rosin, the proportion of resin being from 88% to 700% that of the polyvinyl acetate.

2. A liquid adhesive composition according to claim 1, wherein the resin is a gasoline-insoluble resin obtained by extracting pine wood with a coal tar hydrocarbon solvent, precipitating the gasoline-insoluble fraction by addition of a saturated paraffinic hydrocarbon and separating the precipitate by filtration.

3. A liquid adhesive composition according to claim 1 wherein the resin is a partially gasoline-soluble, dark-colored, hard resin obtained as a by-product when F. F. wood rosin is dissolved in a low boiling petroleum hydrocarbon and refined to pale grades of wood rosin by selective extraction or as the distillation residue in the distillation of F. F. wood rosin to produce pale grades of wood rosin.

4. A liquid adhesive composition according to claim 1 containing a mutual solvent for the resins.

5. A liquid adhesive composition according to claim 1 containing a plasticizer compatible with the polyvinyl acetate and the resin.

NORMAN G. TOMPKINS.